Sept. 7, 1954
C. H. O. BERG
2,688,374
ADSORPTION PROCESS AND APPARATUS
Filed June 8, 1951
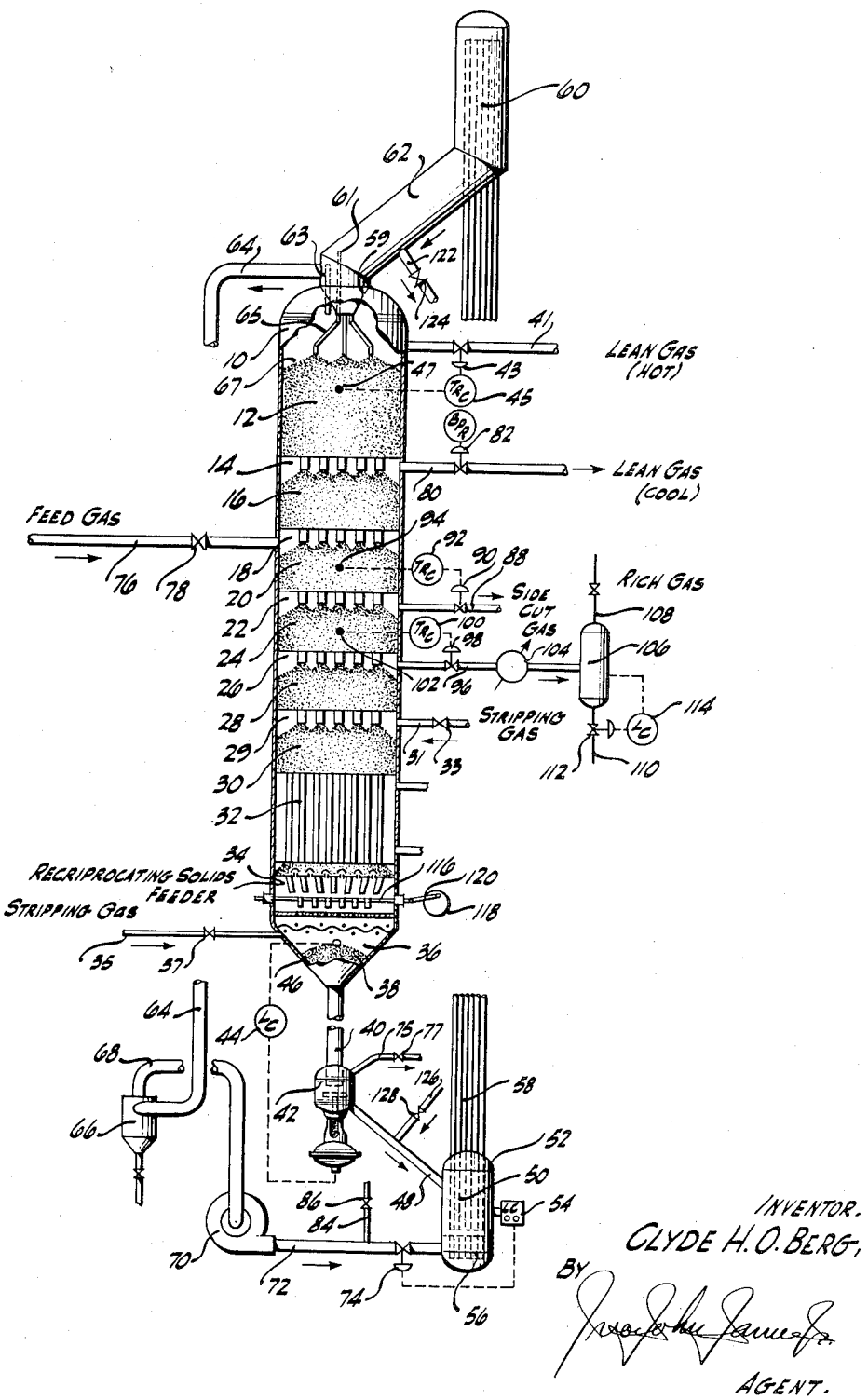
INVENTOR.
CLYDE H. O. BERG,
BY
AGENT.

Patented Sept. 7, 1954

2,688,374

UNITED STATES PATENT OFFICE 2,688,374

ADSORPTION PROCESS AND APPARATUS

Clyde H. O. Berg, Long Beach, Calif., assignor to Union Oil Company of California, Los Angeles, Calif., a corporation of California Application June 8, 1951, Serial No. 230,610

10 Claims. (Cl. 183—4.1)

This invention relates to a process and apparatus for the continuous separation of normally gaseous mixtures by selective adsorption of certain constituents of such mixtures on solid granular adsorbents and further relates to a method of control of such a process. The invention applies particularly to the separation of said gaseous mixtures by selective adsorption on granular charcoal into a plurality of fractions including a heart cut of extreme purity.

The separation of a light gaseous mixture into its constituent parts by the process of selective adsorption offers many advantages over the conventional separation processes of distillation, extraction, etc. In applying the processes of distillation or extraction to the separation of gaseous mixtures containing constituents of relatively low molecular weight, elevated pressures are required together with abnormally low temperatures to condense the gas into a liquid so that it may be separated by these processes. For example, in the preparation of pure ethylene by fractional distillation of ethylene-bearing stocks, a fractionator pressure of 385 pounds per square inch and a reflux temperature of —5° F. are required. In the preparation of pure methane by a similar process a pressure between 500 and 600 pounds per square inch and a reflux temperature of about —150° F. are required. The compression and refrigeration of light gaseous mixtures to permit separation by distillation or extraction are expensive operations and consequently large quantities of gaseous mixtures containing these and other light compounds are often wasted rather than to perform expensive recovery operations.

The conventional process of gas absorption in liquid absorbents has disadvantages which often render it inapplicable to the separation of light gaseous mixtures because generally the gases of low molecular weight are less soluble in the absorbing medium in absorbing compounds of the same class having higher molecular weights. Thus, high pressures of operation are also required in absorption processes in order to obtain an appreciable concentration of the light gaseous compound in the absorbing medium and to avoid circulation of large quantities of the absorbing medium through the system.

The present invention therefore is directed to an improved method and apparatus for the separation of such gaseous mixtures by continuous selective adsorption in which the gaseous mixture is contacted with a moving bed of granular adsorbent and by a succession of adsorption and rectification steps, 2, 3, or 4 or more, wherein substantially pure fractions of the gaseous mixture are separated.

It is a primary object of this invention to provide an improved process for the selective adsorption of gaseous mixtures to produce substantially pure fractions thereof.

It is another object of this invention to provide improvements in the handling of the recirculatory stream of granular adsorbent in such a selective adsorption process.

It is a specific object of the present invention to provide a unique improvement in the cooling of the granular adsorbent prior to its contacting the gaseous mixture in an adsorption zone.

It is a further object of this invention to provide in the selective adsorption process a cooling step wherein unadsorbed lean gas from the adsorption zone passes directly and without other treatment into direct contact with hot lean adsorbent removed from a stripping or desorption zone to form a dry cool adsorbent presaturated with constituents of the unadsorbed lean gas.

Another object is to provide an apparatus capable of effecting the foregoing objects.

Other objects and advantages of the present invention will become apparent as the description thereof proceeds.

Briefly, the present invention comprises an improved selective adsorption process for the separation of gaseous mixtures in which a moving bed of solid granular adsorbent is recirculated successively through zones of cooling, adsorption, at least one rectification zone, desorption or stripping. A gaseous mixture to be separated is passed counter-currently through the adsorption zone forming a rich adsorbent containing the more readily adsorbable constituents leaving a substantially unadsorbed gas containing a major proportion of the less readily adsorbable constituents. In previous modifications of selective adsorption processes this lean gas has been removed as a lean gas product from the system. In one such modification a small proportion (up to 15–20%) of the lean gas is passed counter-currently through a tubular cooling zone in direct contact with the cooling adsorbent to desorb traces of adsorbed stripping gas therefrom.

The rich adsorbent subsequently is contacted in one modification with a rich gas reflux to effect a preferential desorption of traces of the less readily adsorbable constituent from the adsorbent forming a rectified adsorbent by preferential adsorption of the reflux. The thus desorbed constituents pass upwardly through the adsorption zone and are combined with the lean gas.

rectly heated and contacted with a stripping gas directly to desorb the rich gas constituents, part of which are employed as the reflux gas named above, while the remaining part are removed as a rich gas product. The hot lean adsorbent re- The rectified adsorbent is subsequently indimaining is subsequently passed through a cooling zone wherein the adsorbent temperature is reduced to that desired for adsorption of a gaseous mixture, for example a temperature of substantially atmospheric being desirable.

In one modification of the present invention a plurality of rectification zones is provided, in each of which the adsorbent is contacted with a reflux gas of successively greater degree of adsorbability thereby preferentially desorbing gases of successively high molecular weight or higher critical temperature. These preferentially desorbed gases may be employed as reflux in the previous rectification zone while part may be removed as an intermediate gas product. Thus a plurality of fractions may be obtained from a single gaseous mixture.

The specific improvement of the present invention resides in the steps taken to cool the hot lean adsorbent following desorption of the rich gas constituents and prior to contacting the adsorbent with the gaseous mixture to be separated. It has been found that the lean gas stream produced ordinarily as a product gas from the system may be passed directly from the adsorption zone and without other treatment into direct countercurrent contact with the hot lean adsorbent to effec a direct cooling of the adsorbent to a temperature substantially equal to that of the feed gas. The lean gas temperature may be from 1° to as high as 15 or 20° F. higher in temperature than that of the feed gas but it has been found that the hot lean adsorbent may be easily cooled within a short distance above the upper extremity of the adsorption zone to within a few degrees of the feed gas temperature.

The quantity of lean gas necessary to accomplish this direct adsorbent cooling is given by the following equation:

$$W_{1g} = W_a \left(\frac{Cp_a}{Cp_{1g}}\right) \quad (1)$$

wherein $W_{1g}$ is the weight in pounds per hour of lean gas employed as the cooling agent, $W_a$ is the weight in pounds per hour of hot lean adsorbent to be cooled, $Cp$ is the specific heat in B. t. u.'s per pound per ° F. and the subscripts $a$ and $1g$ refer to the adsorbent and the lean gas respectively. (Other consistent units may be substituted.)

The value of $W_{1g}$ in the foregoing equation is a minimum value and preferably at least a 5% excess over the value indicated by the equation as used in actual operation.

In a modification of the present invention the actual quantity of lean gas as coolant required to cool the hot lean adsorbent may be reduced depending upon the quantities of desorbable constituents, usually traces of stripping gas, which remain on the hot lean adsorbent following stripping. Thus the lean gas coolant passing directly in contact with the hot lean adsorbent effects a desorption of adsorbed stripping gas which further cools the hot lean adsorbent by an amount proportional to the heat of desorption. Therefore, in this modification of the present invention it is desirable to operate the heated desorption zone of the selective adsorption column at a temperature at which some residual adsorbed stripping gas remains on the adsorbent to assist in a direct lean gas cooling of the adsorbent thereof especially where the quantity of adsorbent circulated is greater than that which the lean gas alone can cool.

With activated charcoal the quantity of adsorbed stripping steam, which is a preferred stripping gas, remaining on the hot lean adsorbent is a function of the temperature to which the adsorbent is heated and the absolute pressure maintained in the desorption zone. The minimum temperature at which residual steam will remain on a charcoal adsorbent is given as a function of operating perssure by the following equation:

$$T = 175 \, P^{0.191} \quad (2)$$

wherein T is the adsorbent temperature in degrees Fahrenheit and P is the operating pressure of the desorption zone in pounds per square inch absolute. Thus by removing the lean absorbent from effective contact with stripping steam at temperatures higher than T° F. as given by the foregoing equation, no residual stripping gas remains on the adsorbent and the minimum quantity of lean gas required to directly cool this hot lean adsorbent is given by Equation 1. By removing the adsorbent from effective contact with the stripping steam at temperatures in the range of from 1° to 50° F. below T° F. as given by Equation 2, greater or smaller quantities of residual steam remain on the hot lean adsorbent and the quantity of lean gas coolant required is reduced in proportion to the net heat of desorption (averaging about 800 B. t. u. per pound of such adsorbed steam) of the residual stripping gas on the adsorbent which is desorbed from the adsorbent by the action of the lean gas coolant which causes the desorption of substantially all such adsorbed steam. Less lean gas coolant is therefore required.

Removal of the adsorbent from effective contact with the stripping gas and heated adsorbent is meant to include the removal of the hot lean adsorbent from contact with the main stripping gas flow up through the tubes of the heating and desorption zone, when stripping gas is introduced at a point below the heating zone, or from the main internal stripping gas recycle steam existing within the tubes of the heating zone when the stripping gas is introduced above the heating zone.

The following table indicates the quantities of residual stripping steam remaining on a charcoal adsorbent at various pressures of operation and at various desorption zone temperatures:

*Table I*

| Pressure, p. s. i. ab. | T.,° F. | | | | | |
|---|---|---|---|---|---|---|
| | 250 | | 450 | | 650 | |
| | lb./lb. | Percent | lb./lb. | Percent | lb./lb. | Percent |
| 20 | 0.363 | 1,040 | | | | |
| 50 | | | 0.0115 | 10 | | |
| 100 | | | 0.038 | 31 | | |
| 200 | | | 0.078 | 69 | 0.002 | 0.5 |
| 300 | | | 0.308 | 283 | | |
| 500 | | | | | 0.015 | 4.0 |
| 1,000 | | | | | 0.039 | 10.8 |
| 1,500 | | | | | 0.149 | 41 |
| 2,000 | | | | | 0.287 | 80 |

The percentage figures given indicate the amount of direct desorption cooling resulting which is equivalent to the percentage reduction in the lean gas coolant requirement given by Equation 1 above.

This improved type of cooling has numerous inherent advantages over previous methods for cooling stripped adsorbent, the main one of which is the complete elimination of all heat exchange equipment, whether external or internal with respect to the column, which is usually involved in the cooling of such adsorbents. It has previously been suggested to cool granular adsorbent by means of a stream of lean gas which is first passed through a refrigeration or cooling zone which removes a considerable part of the heat contained in the lean gas product at which it is removed from the adsorption zone and subsequently passing this cooled lean gas in direct contact with the hot adsorbent removed from a desorption zone. It has been found that according to the present invention such heat exchange may be eliminated by passing a quantity of lean gas at least equal to the amount given by Equation 1 in direct contact with the hot lean adsorbent. No heat exchange equipment is required and any excess lean gas not needed to cool the adsorbent may optionally be removed from the adsorption zone.

The present invention will be more clearly understood by reference to the accompanying drawing in which an elevation view in cross-section of an improved selective adsorption column according to this invention is shown.

Referring now more particularly to the figure, selective adsorption column 10 is provided therein at successively lower levels with cooling section 12, lean gas disengaging zone 14, adsorption zone 16, feed gas engaging zone 18, primary rectification zone 20, side cut disengaging zone 22, secondary rectification zone 24, rich gas product disengaging zone 26, preferential desorption zone 28, concurrent stripping zone 30, heating zone 32, and the reciprocating solids feeder 34. Granular adsorbent introduced into the top of column 10 passes downwardly successively through the aforementioned zones as a compact moving bed. Granular solids discharged from the solids feeder pass into bottom zone 36 forming accumulation 38. The adsorbent passes through sealing leg 40 into vent gas removal and solids flow control zone 42 which operates in conjunction with level controller 44 and maintains a predetermined level 46 of granular adsorbent in bottom zone 36. Granular adsorbent flows via transfer line 48 into solids inlet zone 50 of induction chamber 52. Level controller 54 detects the solids level maintained in inlet zone 50 and controls the rate of flow of lift gas passing into lift gas inlet zone 56. A suspension of granular adsorbent in lift gases forms which is passed through the plurality of parallel conveyance lines 58 and is introduced into separator zone 60 in which the suspension is broken. The conveyed solids and lift gas subsequently pass as independent phases through transfer line 62 against baffle 61 and into cone 59 from which the solids pass through distributor 65 for re-introduction uniformly throughout the cross sectional area of the top of selective adsorption column 10 forming adsorbent level 67. The lift gas passes downwardly through downcomer 63 through cone 59 for removal through line 41 with the lean gas coolant or it is removed via line 64 and is passed through cyclone 66 for the separation of adsorbent fines. The fines-free lift gas is subsequently passed via line 68 under the influence of blower 70 through line 72 at a rate controlled by valve 74 into lift gas inlet zone 56 to convey further quantities of adsorbent. Part of the adsorbent passing downwardly through transfer line 42 may be removed therefrom through line 122 controlled by valve 124, subjected to reactivation treatment by means not shown and returned to the recirculating adsorbent stream through line 126 controlled by valve 128.

The gaseous mixture to be separated is introduced via line 76 at a rate controlled by valve 78 into feed gas engaging zone 18. The gaseous mixture passes upwardly countercurrent to the downwardly flowing adsorbent in adsorption zone 16. The more readily adsorbable constituents are adsorbed on the adsorbent therein forming a rich adsorbent leaving a less readily adsorbable constituent as a substantially unadsorbed lean gas. At least part of this unadsorbed lean gas is removed from lean gas disengaging zone 14 via line 80 at a rate controlled by back pressure regulator 82 serving to maintain the adsorption column pressure. The rest of the unadsorbed lean gas passes upwardly through cooling zone 12 in direct countercurrent contact with the downwardly flowing adsorbent serving to directly cool the adsorbent, to desorb residual quantities of stripping gas therefrom and to presaturate the adsorbent with the lean gas constituents while dissipating the heat of adsorption thereof. This flow of purge and cooling gas is subsequently removed through line 41 at a rate controlled in accordance with Equation 1 by valve 43 actuated by temperature recorder controller 45 and thermocouple 47. Any remaining gas is combined with the recirculating flow of lift gas from which an amount equivalent to the purge gas flow is removed via line 84 at a rate controlled by valve 86.

The rich adsorbent passes into primary rectification zone 20 wherein it is contacted by a countercurrent flow of constituents of intermediate adsorbability as a reflux. Traces of adsorbed less readily adsorbable constituents are preferentially desorbed from the rich adsorbent forming a partially rectified adsorbent. The reflux gas is preferentially adsorbed and flows downwardly with the adsorbent. The desorbed constituents pass upwardly and are combined with the unadsorbed lean gas stream.

The partially rectified adsorbent is countercurrently contacted in secondary rectification zone 24 with a reflux of the more readily adsorbable constituents, thereby preferentially desorbing the constituents of intermediate adsorbability forming a rectified adsorbent. The desorbed constituents are partly removed from side cut gas disengaging zone 22 via line 88 at a rate controlled by valve 90 in accordance with temperature recorder controller 92 and thermocouple point 94. The rest of the constituents of intermediate adsorbability pass through primary rectification zone 20 as reflux to maintain therein a predetermined adsorbent temperature detected by thermocouple point 94. The adsorption of more readily adsorbable constituents on an adsorbent releases the heat of adsorption and raises the adsorbent temperature. Thus the reflux employed generates a temperature gradient in each rectification zone which is employed as described to control reflux and product gas flows.

The rectified adsorbent flows into preferential desorption zone 28 wherein it is contacted with a countercurrent main stream of stripping gas such as steam introduced via line 31 controlled by valve 33 or via line 35 controlled by valve 37 as described in greater detail below. At the temperature and pressure existing within zone 28, the stripping gas is preferentially adsorbed. The more readily adsorbable constituents are hereby preferentially desorbed and part thereof are removed via line 96 at a rate controlled by valve 98 in accordance with temperature recorder controller 100 in response to the temperature indicated by thermocouple point 102. This stream of more readily adsorbable constituents is passed through rich gas cooler 104 and is introduced into separator 106 wherefrom product rich gas is removed via line 108 and any condensate (such as stripping steam condensate) is removed via line 110 at a rate controlled by valve 112 in accordance with liquid level controller 114. The rest of the desorbed rich gas passes into secondary rectification zone 24 to maintain a predetermined adsorbent temperature therein as a reflux gas. The adsorbed stripping gas passes adsorbed on the adsorbent into the heating zone wherein it is desorbed thermally and then passes upwardly and joins the main stripping gas stream into the preferential desorption zone.

A small portion of the stripping gas recycle introduced via line 31 at a rate controlled by valve 33 passes downwardly through zones 30, 32, 34, through the reciprocating solids feeder and sealing leg 40 into solids flow control zone 42. A portion of the lift gas passes upwardly through transfer line 48 into flow control zone 42. A seal gas mixture of stripping gas and lift gas is removed via line 75 at a rate controlled by valve 77. In this type of operation therefore a relatively small downward flow of stripping gas through the solids feeder zone exists which passes unobstructed through the feeding device by means of the risers and caps in the upper tray and through the vents of the lower tray. This downward flow of stripping gas exerts substantially no pressure drop across the solids feeding device as the flow of solids and gases is effectively separated. By this means no increase in solids discharge rate results due to the concurrent gas flow.

In another modification of this invention stripping gas may be introduced via line 35 at a rate controlled by valve 37 into bottom zone 36, wherefrom it flows countercurrently up through solids feeder 34, tubular heating zone 32, stripping zone 30 and preferential desorption zone 28. In this modification the entire quantity of stripping gas passes through the feeder zone by virtue of the gas risers and caps in the upper tray and the vent openings in the lower tray as well as the substantial clearances around the periphery of the movable tray; only a small pressure drop is exerted across the feeding device and no interference whatsoever with the down flow of adsorbent results.

The partially stripped adsorbent thus formed passes through stripping zone 30 into heating and desorption zone 32. In the latter zone the adsorbent is indirectly heated by condensing vapors or by flue gases to a temperature on the order of from 350° to 650° F. At these temperatures residual adsorbed materials are desorbed from the adsorbent, aided if desired by direct stripping gas contact, leaving a hot lean adsorbent.

The hot lean adsorbent subsequently flows through the reciprocating solids feeder 34 which serves to withdraw equal portions of granular adsorbent from all the incremental areas in the cross-sectional area of the column. Movable tray 116 reciprocates at a rate determined by driving means 118 which may comprise a rotating wheel provided with connecting rod 120 or which may comprise a fluid-actuated cylinder operated on a predetermined time cycle by means of pilot valves, etc., in the well-known ways. The granular adsorbent is recirculated as described above to contact further quantities of the gaseous mixture.

The uniform withdrawal of granular solids throughout the cross-sectional area of the column at a point below tubular heater 32 is reflected throughout the entire height of column 10 in a uniform downward flow of granular solids. By means of the engaging trays or zones shown (zones 14, 18, 22, 26 and 29) the introduction and removal of gases is also uniform across the entire cross-section of the column. Thus each quantity of gas introduced is contacted with a uniform quantity of granular adsorbent, each quantity of adsorbent passed through the individual zones is subjected to contact by a substantially constant velocity, equal volumes of gases to be treated and "channeling" is largely eliminated. Thus the composition of the gas at any cross-section within the column is substantially constant throughout its area thereby minimizing product gas contamination and establishing a high efficiency for adsorbent utilization.

With regard to stripping the adsorbent of its adsorbed materials, these constant flows of gas and solids insure complete desorption of all gases from every part of the adsorbent, thus rendering it possible to discharge active and uncontaminated adsorbent from the bottom of the column with a minimum desorption zone temperature and a minimum quantity of stripping steam.

*Example I*

As a specific example of the application of the present invention to a selective adsorption process the following data are given. A Texas natural gas is to be separated for the removal of 26% of the ethane and all of the $C_3$ and higher molecular weight hydrocarbons.

The feed stream flows at a rate of 33,202 lbs./hr. and is contacted with 37,000 lbs./hr. of activated granular charcoal passed downwardly as a moving bed through a vertical cylindrical selective adsorption column 5.0 feet inside diameter. The pressure of the operation is 600 psia. The adsorbable constituents are produced as a rich gas product at a rate of 2110 lbs./hr. and containing 26% of the ethane and all of the butane, propane and higher molecular weight hydrocarbons. The rich gas product is produced in admixture with 1400 lbs./hr. of steam as stripping gas. The maximum temperature to which the adsorbent is heated for rich gas desorption is 575° F. Under these conditions 1977 lbs./hr. of stripping steam remain on the hot lean adsorbent following stripping. The lean gas product stream is removed from the adsorption zone at a rate of 21,515 lbs./hr. An additional 10,375 lbs./hr. of lean gas is passed from the adsorption zone directly as a lean gas coolant (approximately a 10% excess) through the adsorbent cooling zone which has a depth of 5.0 feet. The coolant gas consists of 12,352 lbs./hr. of mixed lean gas and desorbed stripping gas and contains about 16% steam.

In the foregoing example a total quantity of 4,670,000 B. t. u.'s per hour are removed from the hot lean adsorbent in cooling from 575° F. to a desirable adsorption temperature of 100° F. The stream of mixed lean gas and desorbed steam is removed from the cooling zone at a temperature of 575° F. In this particular cooling operation substantially 34% of the cooling duty is effected by steam desorption while 66% is effected by direct contact with the lean gas coolant.

*Example II*

In another operation involving the same equipment and same feed gas as that of the preceding example in which the stripping temperature is raised to 600° F., the hot lean adsorbent is discharged from the desorption zone containing substantially no adsorbed residual stripping steam. In this modification a greater quantity of lean gas is employed as a cooling agent and 15,685 lbs./hr. of lean gas passes directly through the cooling zone (about a 10% excess) while 16,205 lbs./hr. of lean gas are removed directly from the adsorption zone. The temperature gradient in the cooling zone is found to be extremely sharp when only a small excess of between about 5 and 20% of lean gas over the calculated minimum quantity given by Equation 1 is employed. It is therefore possible in the 5-foot diameter column to have a cooling zone ranging in depth from as low as 0.5 feet to as high as 5.0 feet. In such selective adsorption columns the depth of the lean gas cooling zone may be from 0.1 to 1.0 times the column diameter.

The adsorbent which may be employed in the present selective adsorption process is preferably activated vegetable charcoal but may be any activated charcoal adsorbent or other of the known adsorbents including silica gel, activated aluminum oxide and the other well-known granular adsorbents for gases.

The granular adsorbent is employed in the form of a moving bed and the gas velocities therein are maintained at values insufficient to effect fluidization of the granules. Preferably the mesh size of the adsorbent ranges from about 10 to about 30 but granules as large as about one-half inch to as fine as 100 mesh may be employed with appropriately reduced or increased gas velocities to maintain the compact moving bed of adsorbent.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for separation of gaseous mixtures which comprises passing a moving bed of compact granular adsorbent downwardly by gravity through a cooling zone, an adsorption zone and a desorption zone, passing said gaseous mixture through said adsorption zone thereby adsorbing the more readily adsorbable constituents forming a rich adsorbent leaving less readily adsorbable constituents as a substantially unadsorbed cool lean gas, heating said rich adsorbent to desorb the more readily adsorbable constituents therefrom as a rich gas product leaving a hot lean adsorbent, cooling said hot lean adsorbent prior to contacting further quantities of said gaseous mixture by passing at least a portion of said lean gas as the sole adsorbent coolant directly and without further treatment from said adsorption zone through said cooling zone in direct countercurrent contact with said hot lean adsorbent therein, controlling the lean gas coolant flow relative to the adsorbent flow to form a hot lean gas coolant and cool lean adsorbent, and passing the thus cooled adsorbent into said adsorption zone.

2. A process for the separation of gaseous mixtures which comprises passing a moving bed of granular adsorbent maintained in substantially compact form downwardly by gravity successively through a cooling zone, an adsorption zone and a desorption zone, passing a gaseous mixture to be separated through said adsorption zone thereby adsorbing the more readily adsorbable constituents forming a rich adsorbent leaving less readily adsorbable constituents as a substantially unadsorbed cool lean gas, subsequently heating said rich adsorbent indirectly while directly contacting the adsorbent with a stripping gas to desorb more readily adsorbable constituents forming a rich gas product and leaving a hot lean adsorbent substantially free of adsorbed constituents of said gaseous mixture, passing said hot lean adsorbent into said cooling zone, passing at least a portion of said unadsorbed lean gas directly from said adsorption zone and without further treatment into said cooling zone, flowing this lean gas coolant therethrough in the absence of indirect cooling and in direct countercurrent contact to the hot lean adsorbent at a controlled rate exceeding the product of the weight rate of adsorbent flow times the ratio of the adsorbent specific heat to the coolant gas specific heat thereby forming a hot lean gas coolant and a cool lean adsorbent, removing said hot lean gas coolant from said cooling zone, and passing the cool lean adsorbent directly therefrom into said adsorption zone to contact further quantities of said gaseous mixture.

3. A process for separation of gaseous mixtures which comprises passing a moving bed of compact granular adsorbent downwardly by gravity through a cooling zone, an adsorption zone and a desorption zone, passing said gaseous mixture through said adsorption zone thereby adsorbing the more readily adsorbable constituents forming a rich adsorbent leaving less readily adsorbable constituents as a substantially unadsorbed lean gas, heating said rich adsorbent to desorb the more readily adsorbable constituents therefrom as a rich gas product leaving a hot lean adsorbent, passing said hot lean adsorbent into said cooling zone, passing at least a portion of said lean gas directly and without further treatment from said adsorption zone through said cooling zone forming a hot lean gas coolant and a cool lean adsorbent, the flow rate of said lean gas coolant being controlled at a value of at least:

$$w_{1g} = w_a \left( \frac{Cp_a}{Cp_{1g}} \right)$$

(wherein $w_{1g}$ is the weight in pounds per hour of lean gas employed as the cooling agent, $w_a$ is the weight in pounds per hour of hot lean adsorbent to be cooled, $Cp$ is the specific heat in B. t. u.'s per pound per ° F., and the subscripts $a$ and $1g$ refer to the adsorbent and the lean gas respectively), removing the hot lean gas coolant from the cooling zone, and passing the cool lean adsorbent directly into said adsorption zone to contact further quantities of said gaseous mixture.

4. A process according to claim 3 wherein the quantity of said lean gas coolant passed through said cooling zone is at least 5% in excess of the quantity $w_{1g}$ given by the equation.

5. A process for separation of gaseous mixtures which comprises passing a moving bed of compact granular adsorbent downwardly by gravity through a cooling zone, an adsorption zone and a desorption zone, passing said gaseous mixture through said adsorption zone thereby adsorbing the more readily adsorbable constituents forming a rich adsorbent leaving less readily adsorbable constituents as a substantially unadsorbed lean gas, heating said rich adsorbent to desorb the more readily adsorbable constituents therefrom as a rich gas product leaving a hot lean absorbent, introducing said hot lean adsorbent uniformly throughout the cross-sectional area of said cooling zone for passage downwardly as a moving bed, introducing at least part of said lean gas directly from said adsorption zone and without further treatment into said cooling zone uniformly throughout the entire cross-sectional area thereof, passing said lean gas as the sole coolant in direct countercurrent contact with said absorbent through said cooling zone at a controlled rate sufficient to form a hot lean gas coolant and a cool lean adsorbent, removing the remaining portion of said lean gas from said adsorption zone, and passing the cool lean adsorbent directly into said adsorption zone to contact further quantities of said gaseous mixture.

6. A process for the separation of gaseous mixtures which comprises passing a moving bed of granular adsorbent by gravity successively through a cooling zone, an adsorption zone, a rectification zone and a heating and desorption zone, removing adsorbent from the bottom of said heating and desorption zone, conveying the adsorbent to the top of said cooling zone, distributing said adsorbent therein uniformly throughout the cross-sectional area of said cooling zone, passing a gaseous mixture countercurrently through said adsorption zone forming a rich adsorbent containing the more readily adsorbable constituents and leaving less readily adsorbable constituents as a substantially unadsorbed lean gas, subsequently contacting the rich adsorbent in said rectification zone with a reflux gas of said more readily adsorbable constituents thereby preferentially desorbing adsorbed traces of less readily adsorbable constituents forming a rectified adsorbent, subsequently heating said rectified adsorbent in direct contact with a stripping gas in said heating and desorption zone forming a hot lean adsorbent and desorbed more readily adsorbable constituents, employing part of said more readily adsorbable constituents as reflux in said rectification zone, removing the remaining portion as a rich gas product, passing a portion of said lean gas directly and without further treatment into said cooling zone by uniform introduction of said gas throughout the cross-sectional area thereof, flowing this portion of lean gas in direct countercurrent contact with the hot lean adsorbent therein forming a hot lean gas coolant and a cool lean adsorbent, maintaining the flow of said lean gas coolant at least 5% in excess of the amount $w_{1g}$ given by $$w_{1g} = w_a \left( \frac{Cp_a}{Cp_{1g}} \right)$$

(wherein $w_{1g}$ is the weight in pounds per hour of lean gas employed as the coolant, $w_a$ is the weight in pounds per hour of hot lean adsorbent to be cooled, $Cp$ is the specific heat in B. t. u.'s per pound per °F., and the subscripts $a$ and $1g$ refer to the adsorbent and the lean gas respectively), and removing the remaining portion of lean gas from said adsorption zone.

7. A process according to claim 6 wherein said adsorbent comprises activated charcoal and said stripping gas comprises steam.

8. An apparatus for the separation of gaseous mixtures by continuous selective adsorption which comprises a vertical selective adsorption column provided with a cooling section comprising an empty section of said column adapted to the downward movement of a compact bed of adsorbent, an adsorption section, and a tubular heating and desorption section in which an adsorbent is passed through the tubes thereof, means for indirectly heating said heating and desorption section, means for introducing a gaseous mixture into said adsorption section, means for removing desorbed constituents from said heating and desorption section, means for passing hot lean adsorbent from said heating and desorption section into said cooling section, distributing means for introducing hot lean adsorbent uniformly throughout the transverse cross-sectional area at the top of said cooling section and adapted to form a bed of hot lean adsorbent therein, means for introducing into said cooling section at least part of the unadsorbed lean gas directly and without further treatment from said adsorption section uniformly throughout the cross-sectional area of the bottom of said cooling section for direct countercurrent contact with said adsorbent, means for controlling the flow rate of said first-named portion of said unadsorbed lean gas flowing through said cooling section at a rate sufficient to cool said hot lean adsorbent therein substantially to the temperature at which said lean gas is introduced into said cooling section, means for removing a hot lean gas coolant from the top of said cooling section, and means for removing the remaining portion of said unadsorbed lean gas from the top of said adsorption section.

9. An apparatus according to claim 8 in which the depth of adsorbent maintained in said cooling zone is between 0.1 and 1.0 times the diameter of said cooling zone.

10. An apparatus according to claim 8 wherein said means for controlling the lean gas flow rate through said cooling section comprises a controller instrument, a temperature sensitive means disposed in contact with the adsorbent in said cooling section and connected to said controller instrument, said instrument being also connected to valve means in said means for removing said hot lean gas coolant from the top of said cooling section.

References Cited in the file of this patent

UNITED STATES PATENTS

| Number | Name | Date |
|---|---|---|
| 1,533,716 | Voress et al. | Apr. 14, 1925 |
| 2,492,401 | Schutte | Dec. 27, 1949 |
| 2,519,873 | Berg | Aug. 22, 1950 |
| 2,519,874 | Berg | Aug. 22, 1950 |
| 2,527,964 | Robinson | Oct. 31, 1950 |
| 2,544,214 | Berg | Mar. 6, 1951 |
| 2,635,706 | Gilmore | Apr. 21, 1953 |

FOREIGN PATENTS

| Number | Country | Date |
|---|---|---|
| 367,209 | Great Britain | Feb. 18, 1932 |